United States Patent
Hegde et al.

(10) Patent No.: US 10,794,094 B2
(45) Date of Patent: Oct. 6, 2020

(54) GLOVE BOX SELF-LOCKING FEATURE

(71) Applicant: FORD GLOBAL TECHNOLOGIES, LLC, Dearborn, MI (US)

(72) Inventors: Vijaykumar Hegde, Canton, MI (US); Matthew J. Hickey, Canton, MI (US); Thomas Junior Luckett, Saline, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 178 days.

(21) Appl. No.: 16/013,171

(22) Filed: Jun. 20, 2018

(65) Prior Publication Data

US 2019/0390484 A1    Dec. 26, 2019

(51) Int. Cl.
*E05B 77/04*    (2014.01)
*E05B 83/30*    (2014.01)
*B60R 7/06*    (2006.01)

(52) U.S. Cl.
CPC .............. *E05B 77/04* (2013.01); *B60R 7/06* (2013.01); *E05B 83/30* (2013.01)

(58) Field of Classification Search
CPC ............ B60R 7/06; E05B 83/30; E05B 77/04
USPC ...................................................... 296/37.12
See application file for complete search history.

(56) References Cited

U.S. PATENT DOCUMENTS

| 7,484,792 | B2 * | 2/2009 | Penner ...................... B60R 7/06 280/752 |
| 8,251,399 | B2 * | 8/2012 | Babian .................. B60R 21/045 280/752 |
| 9,771,743 | B2 | 9/2017 | Roychoudhury et al. |
| 2012/0112489 | A1 | 5/2012 | Okimoto |
| 2016/0024821 | A1 | 1/2016 | Aselage et al. |

FOREIGN PATENT DOCUMENTS

KR    101467368    2/2010

\* cited by examiner

*Primary Examiner* — Joseph D. Pape
*Assistant Examiner* — Dana D Ivey
(74) *Attorney, Agent, or Firm* — David Coppiellie; Price Heneveld LLP

(57) ABSTRACT

A glove box retainer for a glove box comprises a tab or a catch on a forward portion of a movable bin received within a surround and a corresponding catch or tab on a forward portion of a surround disposed forward of the tab or catch on the movable bin when the movable bin is in a closed position. The movable bin displaces the tab or the catch on the movable bin so that it is juxtaposed against and displaced forward of the catch or tab on the surround to retain the glove box in the closed position during a frontal impact event.

12 Claims, 6 Drawing Sheets

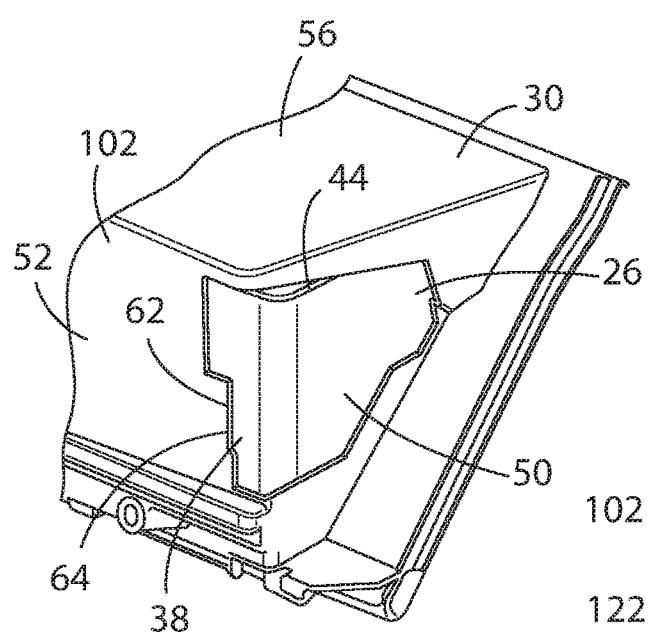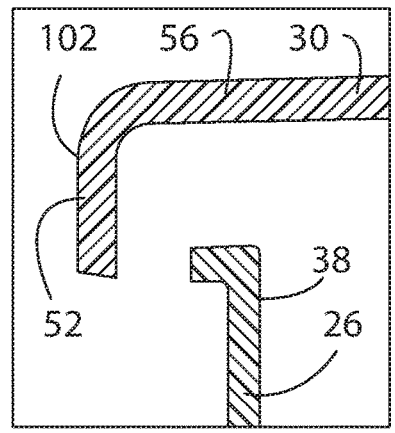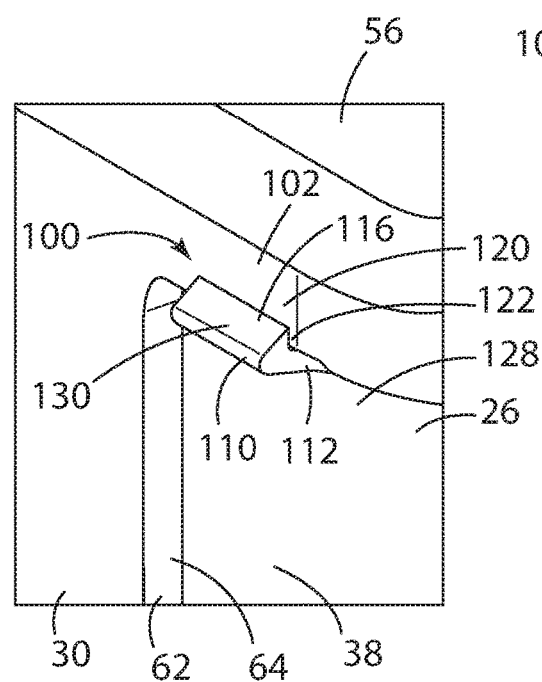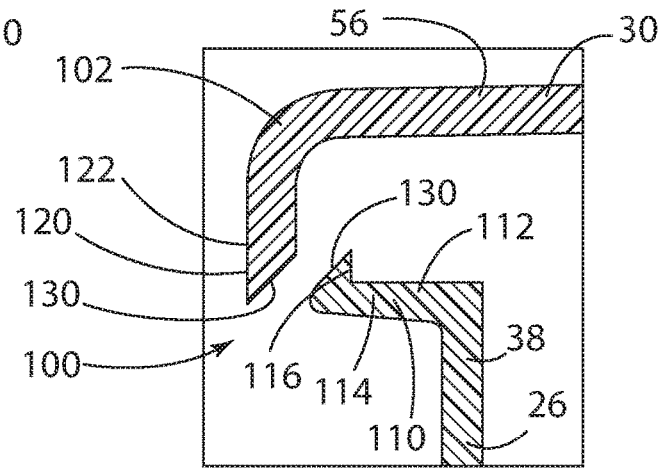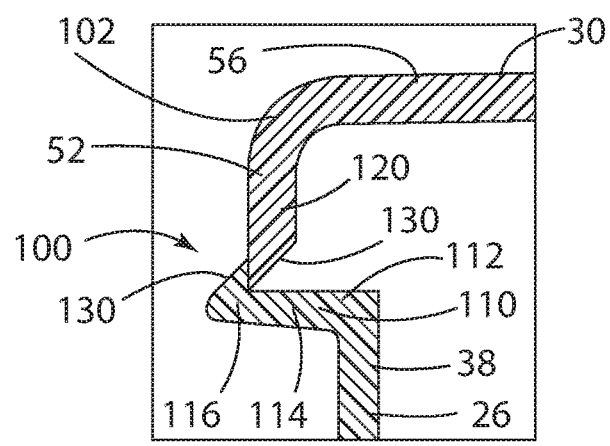
FIG. 11A
FIG. 12A
FIG. 11B
FIG. 12B
FIG. 12C

GLOVE BOX SELF-LOCKING FEATURE

FIELD OF THE INVENTION

The present invention generally relates to an improved design and structure of a glove box for use in a motor vehicle to improve the integrity of motor vehicle instrument panel components during and after a frontal impact event, and, more particularly, an improved glove box bin and surround that retain the glove box in a closed position during and after a frontal impact event.

BACKGROUND OF THE INVENTION

Motor vehicle instrument panels, in addition to providing a platform upon which motor vehicle controls and displays may be mounted, are also typically provided with one or more closable storage bins, commonly referred to as glove boxes, accessible by the motor vehicle occupants within the interior cabin of the motor vehicle and for storing smaller articles and documents.

It is desirable that glove boxes be designed such that the glove boxes are retained in the closed position.

SUMMARY OF THE INVENTION

According to one aspect of the present disclosure, a glove box retainer for retaining a glove box mounted in a motor vehicle instrument panel in a closed position during and after a frontal impact event is disclosed, the glove box comprising a movable bin having an outerdoor panel and an open receptacle received within a cavity of a surround fixedly mounted in the motor vehicle instrument panel, the movable bin having a normally closed position, wherein the movable bin is disposed within the cavity of the surround and the open receptacle is not exposed, and an open position, wherein the movable bin is withdrawn from and proximate the cavity of the surround and the open receptacle is exposed. The glove box retainer comprises a first interlocker disposed proximate a forward edge of the open receptacle of the movable bin and a second interlocker disposed proximate a forward portion of the surround, the second interlocker being disposed proximate to and displaced forward of the first interlocker when the movable bin is in the normally closed position. A predetermined force against the outer door panel of the movable bin displaces the open receptacle and the first interlocker forward and into engagement with the second interlocker, whereby the first interlocker is juxtaposed against and displaced forward of the second interlocker to retain the glove box in the closed position during and after the frontal impact event.

Embodiments of the first aspect of the disclosure can include any one or a combination of the following features:
  The first interlocker comprises a tab disposed proximate an forward edge of the open receptacle of the movable bin and the second interlocker comprises a catch disposed on an edge of the surround;
  The first interlocker and the second interlocker further comprises a cam surface facing the other of the first interlocker and the second interlocker, whereby one of the first interlocker or second interlocker is displaced against the cam surface to allow the first interlocker to be displaced forward of the second interlocker during and after a frontal impact event;
  The first interlocker and the second interlocker further each comprise a facing and interacting cam surface, whereby one of the first interlocker or second interlocker is displaced to allow the first interlocker to be displaced forward of the second interlocker during and after a frontal impact event;
  The first interlocker comprises a flexible projecting tab relative the second interlocker and the second interlocker comprises a catch disposed on a portion of an edge of the surround;
  The second interlocker further comprises a notch formed in the edge of the surround within which the flexible projecting tab is received during and after a frontal impact event;
  The flexible projecting tab is oriented along a substantially vertical plane and the catch disposed on a portion of an edge of the surround is oriented along a substantially vertical edge of the surround;
  The first interlocker comprises a catch disposed on an forward edge of the open receptacle of the movable bin and the second interlocker comprises a flexible projecting tab disposed on a portion of an edge of the surround;
  The first interlocker is disposed on an outboard or inboard corner of the open receptacle of the movable bin and the second interlocker is disposed on a corresponding outboard or inboard corner of the forward portion of the surround;
  The first interlocker is disposed on each of the outboard and inboard corners of the open receptacle of the movable bin and the second interlocker is disposed on each of the corresponding outboard and inboard corners of the forward portion of the surround;
  The first interlocker may be manually disengaged from the second interlocker after the frontal impact event by displacing the first interlocker rearward relative to the second interlocker to withdraw the movable bin from the cavity of the surround and to expose the open receptacle; and
  The glove box further comprises a primary latch mechanism.

According to another aspect of the present disclosure, a glove box retainer comprises a tab on a forward portion of a movable bin received within a surround and a catch on a forward portion of the surround disposed forward of the tab when the movable bin is in a closed position, wherein the movable bin displaces the tab so that it is juxtaposed against and displaced forward of the catch to retain the glove box in the closed position during a frontal impact event.

Embodiments of the second aspect of the disclosure can include any one or a combination of the following features:
  The glove box retainer retains a glove box mounted in a motor vehicle instrument panel during and after the frontal impact event and the movable bin includes an outer door panel and an open receptacle received within a cavity of the surround, the surround being fixedly mounted in the motor vehicle instrument panel, and wherein the movable bin has a normally closed position, wherein the movable bin is disposed within the cavity of the surround and the open receptacle is not exposed, and an open position, wherein the movable bin is withdrawn from and proximate the cavity of the surround and the open receptacle is exposed;
  The tab of the glove box retainer is disposed on a forward edge of the open receptacle of the movable bin and the catch of the glove box retainer is disposed on a forward edge of the forward portion of the surround;
  The movable bin is pivotally mounted at a lower edge thereof relative the surround, whereby the open receptacle may be pivoted into the cavity of the surround when the movable bin is in the normally closed position and the open receptacle may be pivoted out of the cavity of the surround when the movable bin is in the open position; and The movable bin is slidably mounted relative the surround, whereby the open receptacle may be slidably inserted into the cavity of the surround when the movable bin is in the normally closed position and the open receptacle may be slidably withdrawn from the cavity of the surround when the movable bin is in the open position.

According to a further aspect of the present disclosure, a glove box retainer for retaining a glove box mounted in a motor vehicle instrument panel in a closed position during and after a frontal impact event is disclosed, the glove box comprising a movable bin having an outer door panel and an open receptacle received within a cavity of a surround fixedly mounted in the motor vehicle instrument panel, the movable bin having a normally closed position, wherein the movable bin is disposed within the cavity of the surround and the open receptacle is not exposed, and an open position, wherein the movable bin is withdrawn from and proximate the cavity of the surround and the open receptacle is exposed. The glove box retainer comprises a tab disposed proximate a forward edge of the open receptacle or the movable bin or a forward portion of the surround and a catch disposed proximate the other of the forward edge of the open receptacle of the movable bin or the forward portion of the surround. The tab or catch is disposed proximate to and displaced forward of the other of the tab or catch when the movable bin is in the normally closed position. A predetermined force against the outer door panel of the movable bin displaces the open receptacle and the tab or catch forward and into engagement with the other of the tab or catch, whereby the tab or catch is juxtaposed against and displaced forward of the other of the tab or catch to retain the glove box in the closed position during and after the frontal impact event.

Embodiments of the third aspect of the disclosure can include any one or a combination of the following features:

The tab or catch further comprises a cam surface facing the other of the tab or catch, whereby one of the tab or catch is displaced against the cam surface to allow one of the tab or catch to be displaced forward of the other of the tab or catch during and after a frontal impact event; and Each of the movable bin and surround comprise an integrated injection molded polymeric material within which each of the tab and catch are integrally molded, respectively.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 11A is a front and side perspective view of the inboard corner of the glove box and surround without the glove box retainer of the present disclosure;

FIG. 11B is a front and side perspective view of the inboard corner of the glove box and surround provided with the glove box retainer of the present disclosure subsequent to a frontal impact event;

FIG. 12A is a side cross-sectional view of the inboard corner of the glove box and surround without the glove box retainer of the present disclosure prior to a frontal impact event;

FIG. 12B is a side cross-sectional view of the inboard corner of the glove box and surround provided with the glove box retainer of the present disclosure prior to a frontal impact; and FIG. 12C is a side cross-sectional view of the inboard corner of the glove box and surround provided with the glove box retainer of the present disclosure subsequent to a frontal impact.

DETAILED DESCRIPTION OF THE PREFERRED EMBODIMENTS

Figure 1:
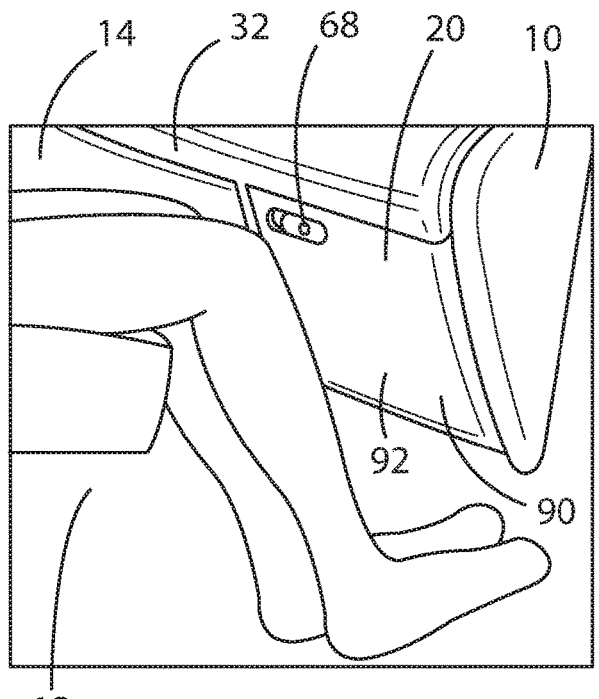
FIG. 1 is a perspective view of a lower portion of a motor vehicle instrument panel mounted in the vehicle-forward portion of an interior cabin of the motor vehicle prior to a frontal impact event.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 2:
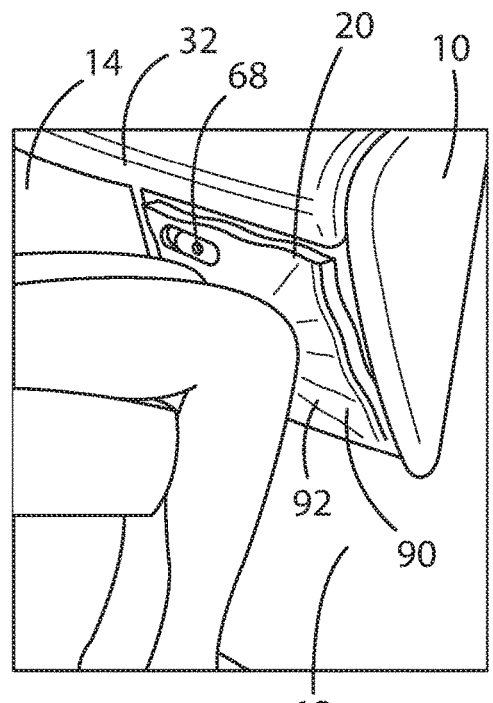
FIG. 2 is a perspective view of the lower portion of a motor vehicle instrument panel mounted in the vehicle-forward portion of an interior cabin of the motor vehicle subsequent to a frontal impact event.
Figure 3:
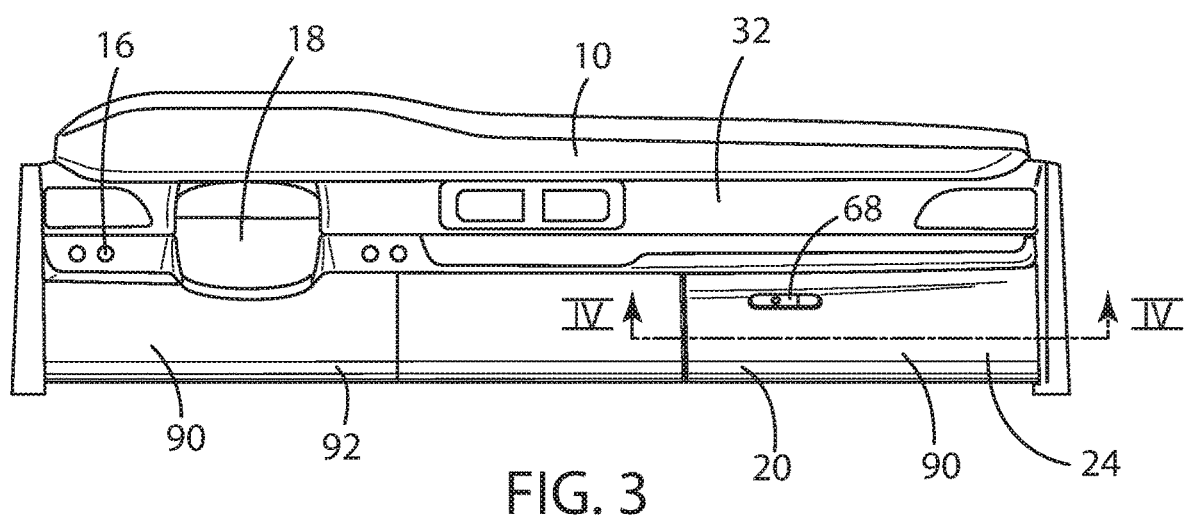
FIG. 3 is a plan view of the motor vehicle instrument panel mounted in the vehicle-forward portion of an interior cabin of the motor vehicle.

Referring to FIGS. 1-3, reference numeral 10 generally designates a motor vehicle instrument panel for mounting in the vehicle-forward portion of an interior cabin 12 of the motor vehicle 14. As noted above, the motor vehicle instrument panel 10 is commonly used to provide a platform upon which motor vehicle controls 16 and displays 18 may be mounted. As is also common, a glove box 20 may be incorporated into the motor vehicle instrument panel 10, whereby motor vehicle occupants within the interior cabin 12 of the motor vehicle 14 may have access to smaller articles and documents stored therein.

Figure 4:
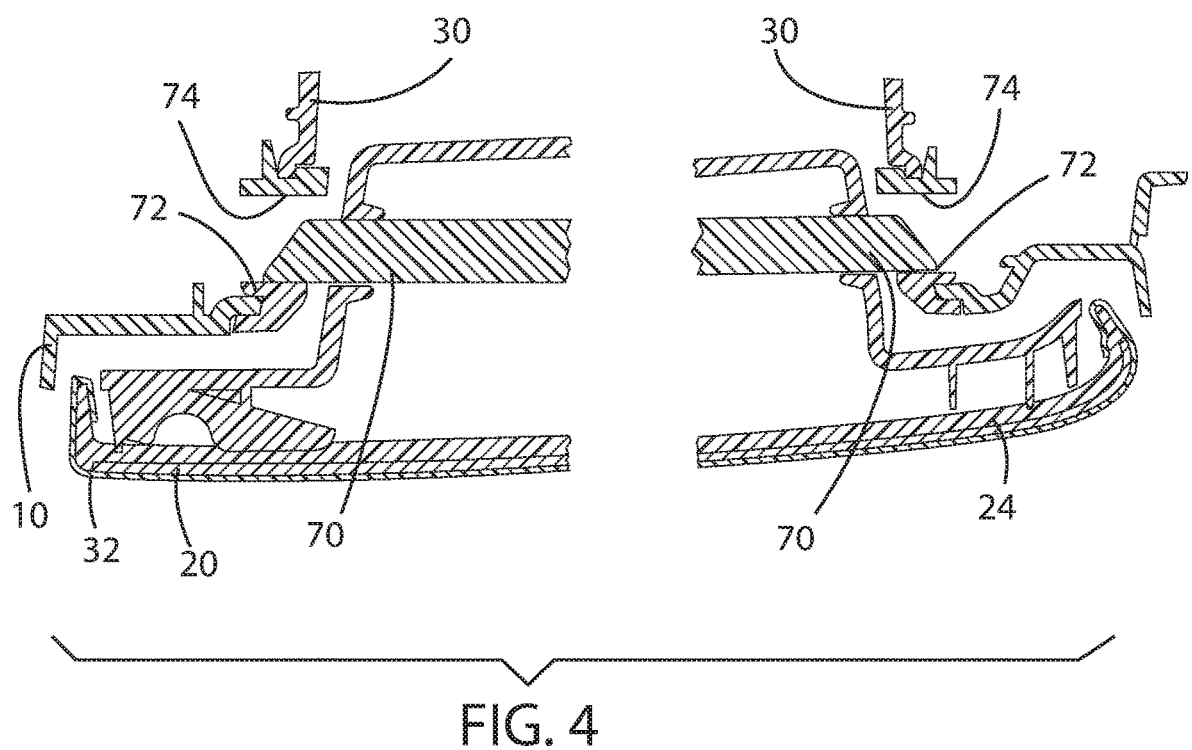
FIG. 4 is a cross-sectional view of the motor vehicle instrument panel shown in FIG. 3 taken along the line IV-IV, wherein the glove box is in the normally closed position.
Figure 5:
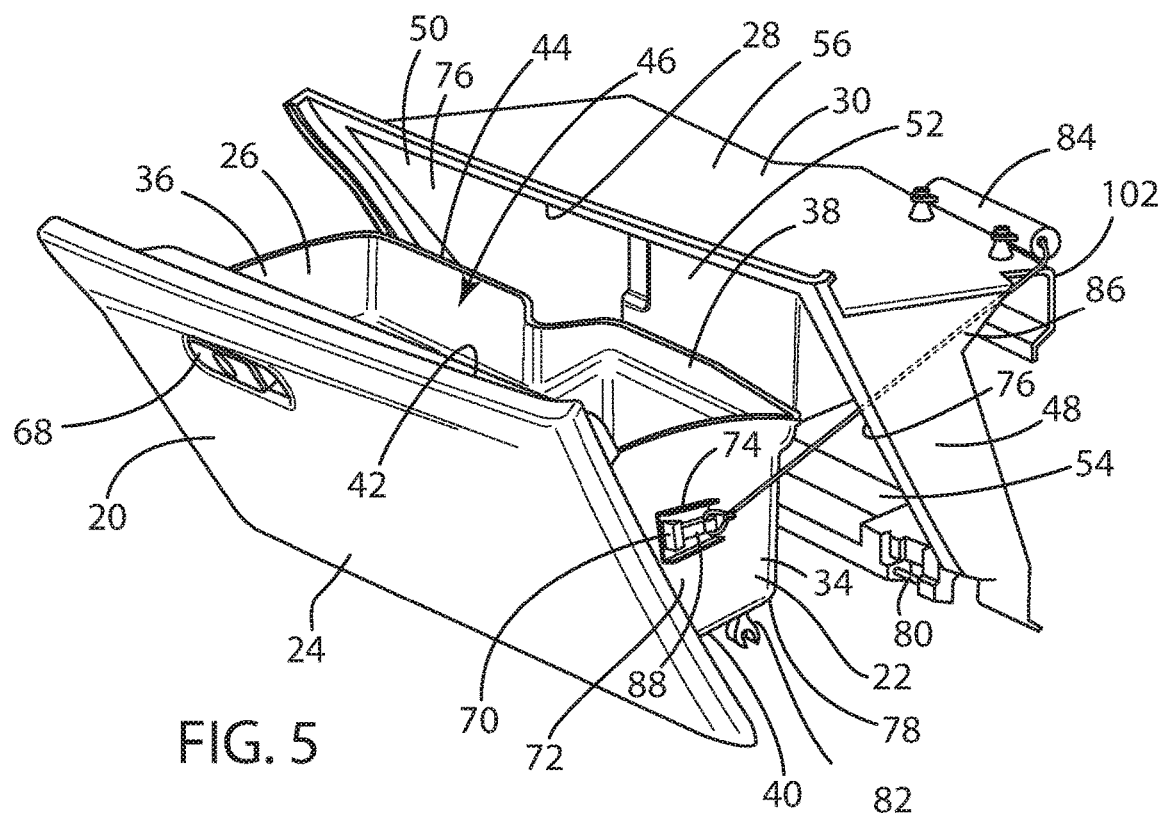
FIG. 5 is a rear and side perspective view of the glove box and surround without the glove box retainer of the present disclosure.
Figure 6:
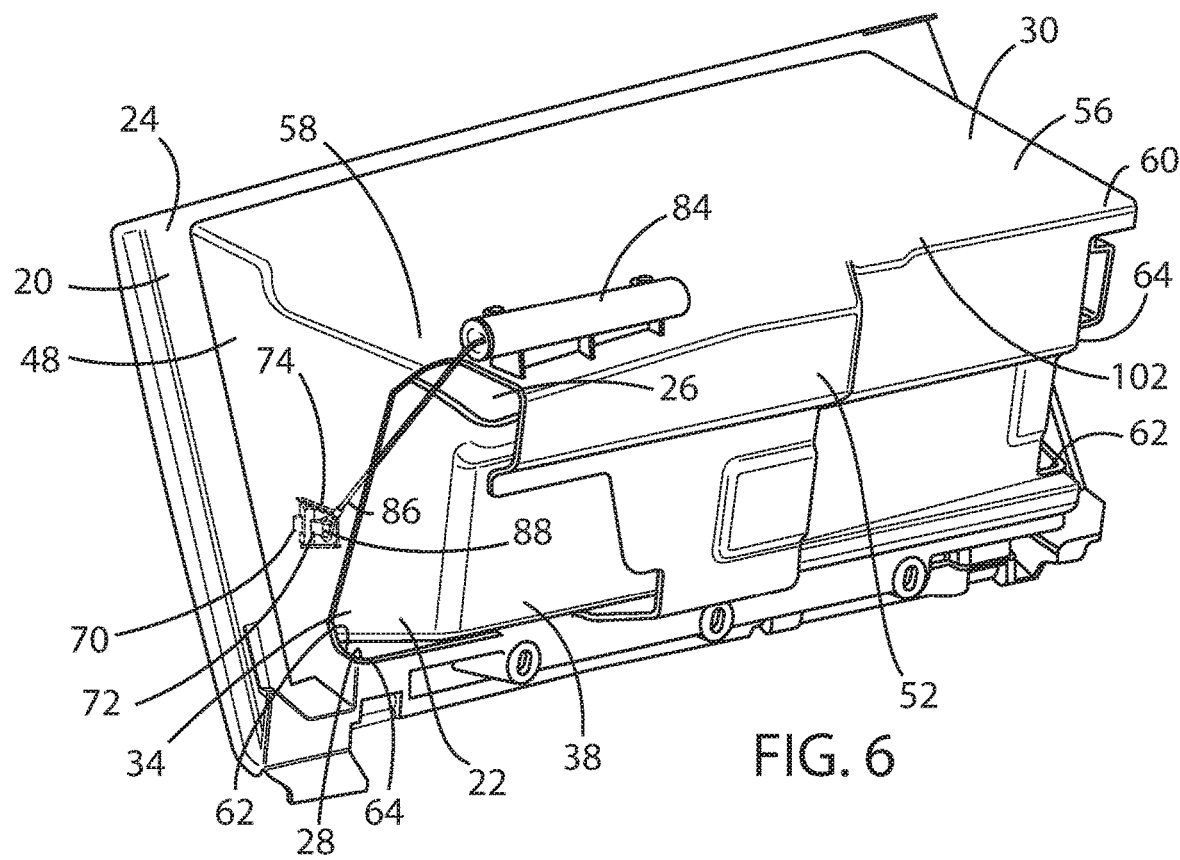
FIG. 6 is a front and side perspective view of the glove box and surround without the glove box retainer of the present disclosure.

As shown in FIGS. 4-6, the glove box 20 may comprise a movable bin 22 having an outer door panel 24 and an open receptacle 26 received within a cavity 28 of a surround 30 fixedly mounted in the motor vehicle instrument panel 10. The outer door panel 24 of the movable bin 22 of the glove box 20 may be preferably integrated with the rearward-facing surface 32 of the motor vehicle instrument panel 10. Thus, when the glove box 20 is shifted to a normally closed position, the movable bin 22 is disposed within the cavity 28 of the surround 30 and the open receptacle 26 is not exposed, such that the glove box 20 is not readily visible or obvious.

As perhaps best seen in FIGS. 5 and 6, the movable bin 22 preferably comprises a generally rectangular open receptacle 26 having a pair of opposed side walls 34, 36, a forward wall 38, and a bottom wall 40. The rearward wall 42 is preferably formed by the outer door panel 24. Each of the opposed side walls 34, 36 and the forward wall 38 have an upper edge 44 that defines the opening 46 of the open receptacle 26, into which the aforementioned smaller articles and documents may be inserted to be stored.

The surround 30 preferably comprises a separate component that is fixedly mounted in the motor vehicle instrument panel 10. The surround 30 preferably comprises a pair of opposed side walls 48, 50, a forward wall 52, a bottom wall 54, and a top wall 56, all of which cooperate to form the cavity 28 within which the open receptacle 26 of the movable bin 22 is received. Preferably, the size and configuration of the cavity 28 is designed to closely match that of the movable bin 22, wherein when the movable bin 22 is received within the cavity 28, the top wall 56 of the surround 30 effectively closes the opening 46 of the open receptacle 26, whereby the smaller articles and documents stored therein may be secured when the glove box 20 is in the normally closed position. As may be seen in FIG. 6, the outboard and inboard corners 58, 60 of the surround 30 may each include a cutout 62 to save material and weight, as well as provide access for various features, as described herein. Each of the cutouts 62 preferably extends from one of the opposed side walls 48, 50 to the top wall 56 and to the forward wall 52 of the surround 30, and define an edge 64 thereabout.

The glove box 20 may be further provided with a primary latch assembly 66, which preferably includes a latch 68 operably coupled with a pair of opposed spring-loaded latch rods 70 disposed on either side of the glove box 20. Each of the opposed spring-loaded latch rods 70 engages a striker 72 disposed on a recess 74 of an inner side surface 76 of the surround 30, so as to retain the glove box 20 in the normally closed position, as shown in FIGS. 1, 3, and 6. When actuated, the latch 68 is effective in withdrawing the opposed spring-loaded latch rods 70 so that the glove box 20 may be shifted to an open position, wherein the movable bin 22 may be withdrawn from and situated proximate the cavity 28 of the surround 30 and the opening 46 of the open receptacle 26 is exposed.

As shown in FIG. 5, the movable bin 22 may be pivotally mounted at a lower edge 78 thereof and rotated relative the surround 30 via a pivot rod 80 formed in the surround 30 and a corresponding clasp 82 formed on the bottom wall 40 of the open receptacle 26 The movable bin 22 and the open receptacle 26 may thus be pivoted into the cavity 28 of the surround 30 when the movable bin 22 is in the normally closed position, and the movable bin 22 and open receptacle 26 may be pivoted out of the cavity 28 of the surround 30 when the movable bin 22 is in the open position. As shown in FIG. 5, a retractable limit cable housing 84 is preferably attached to the top wall 56 of the surround 30 from which a retractable limit cable 86 extends through one of the corner cutouts 62 and is attached to a keeper 88 on a side wall 34 of the open receptacle 26 to limit further opening of the glove box 20.

Alternatively, the movable bin 22 may be slidably mounted relative the surround 30 (not shown), whereby the movable bin 22 and open receptacle 26 may be slidably inserted into the cavity 28 of the surround 30 when the movable bin 22 is in the normally closed position, and the movable bin 22 and open receptacle 26 may be slidably withdrawn from the cavity 28 of the surround 30 when the movable bin 22 is in the open position.

Such motor vehicle instrument panels 10 also often include knee bolsters 90, which serve an important function in the mitigation of motor vehicle occupant injuries, particularly in the event of a frontal impact event, where the inertia of the motor vehicle occupants propels the motor vehicle occupants forward relative the interior cabin 12 of the motor vehicle 14 and typically into contact with a lower portion 92 of the motor vehicle instrument panel 10. In such event, it is anticipated that the lower portion 92 of the motor vehicle instrument panel 10 will be deformed in accordance with a defined force-displacement curve in order to minimize peak femur loads experienced by the motor vehicle occupants and dissipate the kinetic energy of the motor vehicle occupants.

Figure 7:
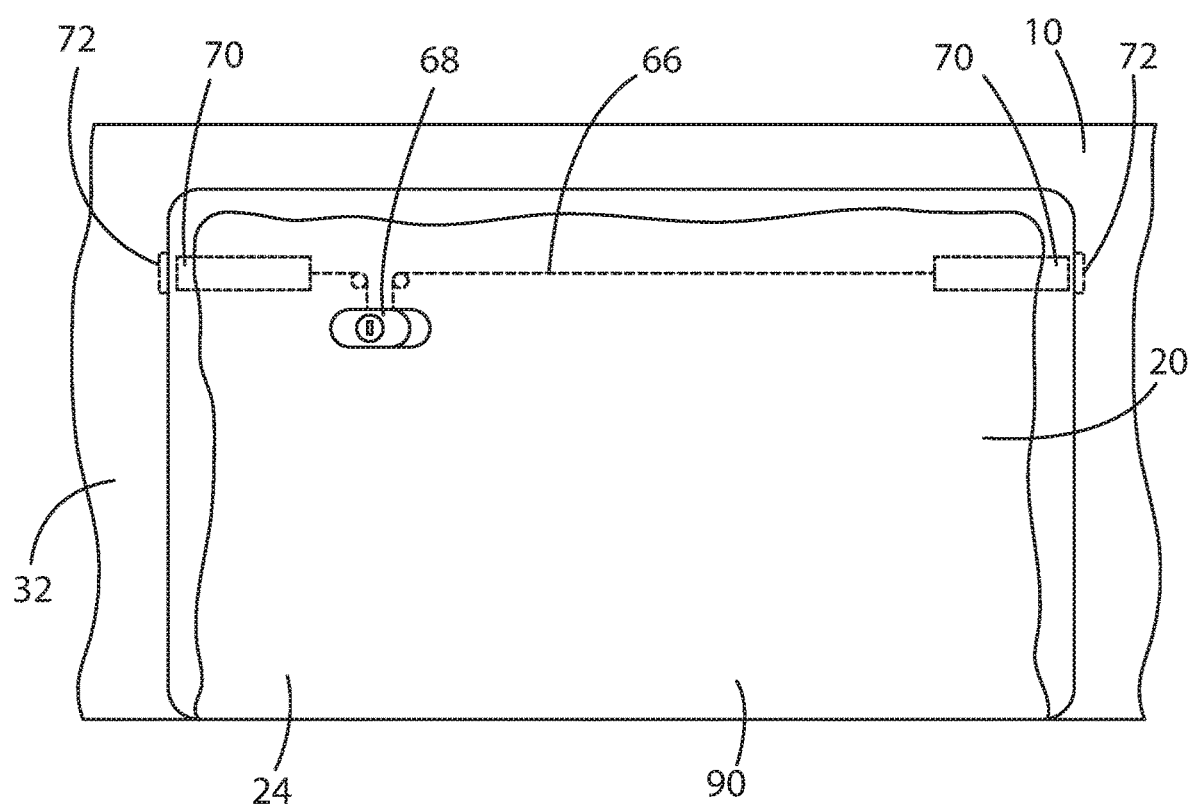
FIG. 7 is a schematic plan view of the glove box subsequent a frontal impact event.

As shown in FIGS. 1-3, however, the glove box 20 may also be mounted on the lower portion 92 of the motor vehicle instrument panel 10 and may further serve as a knee bolsters 90. The outer door panel 24 of the glove box 20, which is often integrated with the rearward-facing surface 32 of the motor vehicle instrument panel 10, may be contacted and displaced by the knees of the motor vehicle occupants during a frontal impact event. As depicted in FIG. 2, the knees of the motor vehicle occupants may displace the glove box 20 forward such that the opposed spring-loaded latch rods 70 are no longer capable of retaining the glove box 20 in the normally closed position. For example, in certain designs, each of the latch rods 70 must maintain at least 7 mm of engagement of the latch rod 70 with striker 72 in order to reliably maintain the glove box 20 in the normally closed position. Displacement of the outer door panel 24 of the glove box 20 may reduce this engagement, as shown in FIG. 7. As a result of such displacement of the outer door panel 24 of the glove box 20, the primary latch assembly 66 that retains the glove box 20 in the closed position may be compromised, allowing the glove box 20 to shift to the open position, which may be undesirable.

The improvements to the design and structure of the glove box 20 and surround 30 herein disclosed more reliably retain the glove box 20 in the normally closed position during and after a frontal impact event through the use of additional automatic locking features, preferably located proximate either side wall 34, 36 or the forward wall 38 of the open receptacle 26 of the glove box 20. These features effectively retain the glove box 20 in the normally closed position, even when the latch rods 70 are no longer functional, and include a glove box retainer 100 for retaining the glove box 20 mounted in a motor vehicle instrument panel 10 in a normally closed position during and after a frontal impact event.

Figure 8A:
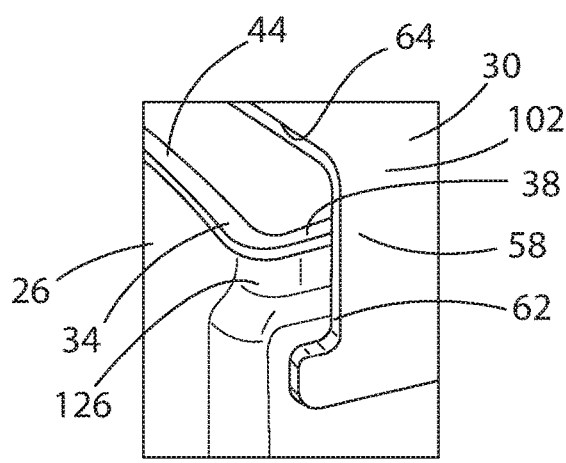
FIG. 8A is a front and side perspective view of the outboard corner of the glove box and surround without the glove box retainer of the present disclosure.
Figure 8B:
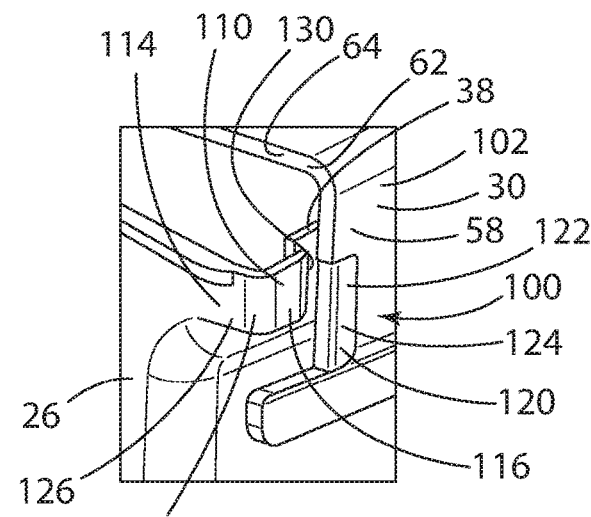
FIG. 8B is a front and side perspective view of the outboard corner of the glove box and surround provided with the glove box retainer of the present disclosure.
Figure 9A:
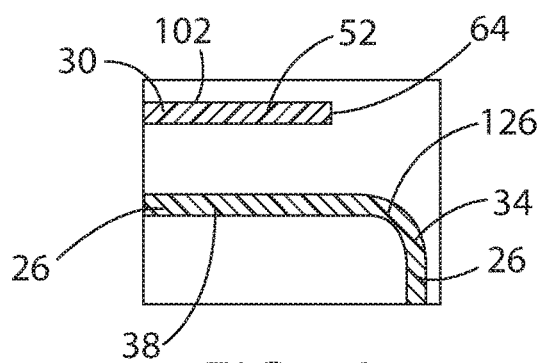
FIG. 9A is a top cross-sectional view of the outboard corner of the glove box and surround without the glove box retainer of the present disclosure prior to a frontal impact event.
Figure 9B:
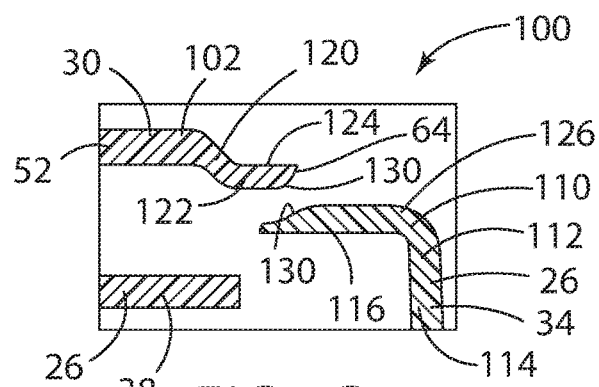
FIG. 9B is a top cross-sectional view of the outboard corner of the glove box and surround provided with the glove box retainer of the present disclosure prior to a frontal impact event.

The glove box retainer 100 may include a first interlocker 110 preferably disposed proximate the forward wall 38, even more preferably disposed adjacent the side wall 34, 36 near the forward wall 38, of the open receptacle 26 of the movable bin 22 and the upper edge 44 of the forward wall 38. A second interlocker 120 may be disposed proximate a forward portion 102 of the surround 30, preferably along the edge 64 of the cutout 62 on the forward wall 52 of the surround 30. The second interlocker 120 is disposed proximate to and displaced forward of the first interlocker 110 when the movable bin 22 is in the normally closed position, as best seen in FIGS. 8B, 9B, and 12B.

Preferably, the first interlocker 110 comprises a flexible projecting tab 112 extending forward toward the second interlocker 120 and disposed proximate the upper edge 44 of the forward wall 38 of the open receptacle 26 of the movable bin 22. The flexible projecting tab 112 preferably comprises a forwardly extending finger portion 114 relative the upper edge 44 of the forward wall 38 of the open receptacle 26 of the movable bin 22 and a transverse latch portion 116 extending orthogonally relative the forwardly extending finger portion 114. The flexible projecting tab 112 may be oriented along a substantially vertical plane, as shown in FIG. 8B. Alternatively, the flexible projecting tab 110 may be oriented along a substantially horizontal plane, as shown in FIGS. 11B and 12B.

The second interlocker 120 preferably comprises a catch 122 disposed on a portion of the edge 64 of one of the cutouts 62 of the surround 30, preferably on the edge 64 of one of the cutouts 62 on the forward wall 52 of the surround 30. The second interlocker 120 may further comprise a notch 124 formed in the edge 64 of the cutout 62 of the surround 30 within which the transverse latch portion 116 of the flexible projecting tab 112 is received during and after a frontal impact event, as shown in FIG. 8B. The catch 122 is preferably disposed on a portion of an edge 64 of the cutout 62 on the forward wall 52 of the surround 30 and may be also oriented along a substantially vertical edge 64 of the cutout 62 on the forward wall 52 of the surround 30 to match the flexible projecting tab 112. Alternatively, the corresponding catch 122 disposed on a portion of an edge 64 of the cutout 62 on the forward wall 52 of the surround 30 may be oriented along a substantially horizontal edge 64 of the cutout 62 on the forward wall 52 of the surround 30 to match the flexible projecting tab 112, as shown in FIG. 11B.

Figure 10A:
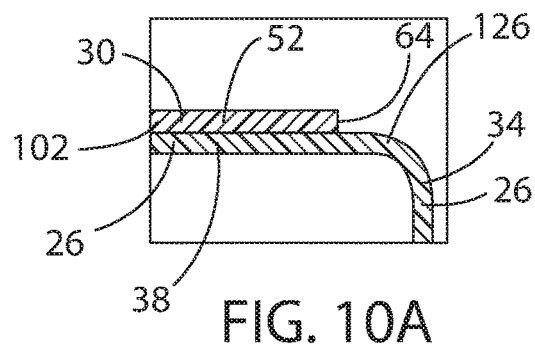
FIG. 10A is a top cross-sectional view of the outboard corner of the glove box and surround without the glove box retainer of the present disclosure subsequent to a frontal impact event.
Figure 10B:
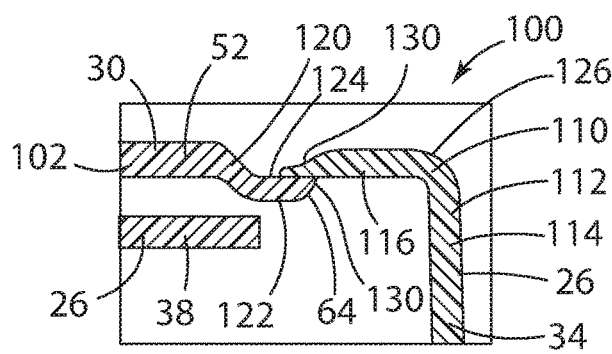
FIG. 10B is a top cross-sectional view of the outboard corner of the glove box and surround provided with the glove box retainer of the present disclosure subsequent to a frontal impact event.

In operation, application of a predetermined force created during a frontal impact event against the outer door panel 24 of the movable bin 22 displaces the open receptacle 26 forward. This, in turn, moves the first interlocker 110 forward and into engagement with the second interlocker 120, whereby the first interlocker 110 is then juxtaposed against and displaced forward of the second interlocker 120 to retain the glove box 20 in the normally closed position during and after the frontal impact event, as shown in FIGS. 10B and 12C.

One of the first interlocker 110 and the second interlocker 120 may further preferably comprise an inclined cam surface 130 facing the other of the first interlocker 110 and the second interlocker 120, as shown in FIGS. 8A-12C, whereby one of the first interlocker 110 or second interlocker 120 is displaced against the cam surface 130 to allow the first interlocker 110 to be displaced forward of the second interlocker 120 during and after a frontal impact event. Preferably, both the first interlocker 110 and the second interlocker 120 each further comprises complimentary facing and interacting cam surfaces 130, as shown in FIG. 9B, whereby one of the first interlocker 110 or second interlocker 120 is displaced to allow the first interlocker 110 to be displaced forward of the second interlocker 120 during and after a frontal impact event.

Alternatively, the components for the glove box retainer 100 may be reversed, and the first interlocker 110 may comprise a catch 122 disposed on the upper edge 44 of the forward wall 38 of the open receptacle 26 of the movable bin 22, while the second interlocker 120 may comprise a rearward flexible projecting tab 112 disposed on a portion of an edge 64 of the cutout 62 of the surround 30. That is, the flexible projecting tab 112 may be disposed proximate the upper edge 44 of the forward wall 38 of the open receptacle 26 of the movable bin 22, or a forward portion 102 of the surround 30 and the catch 122 may be disposed proximate the other of the upper edge 44 of the forward wall 38 of the open receptacle 26 of the movable bin 22 or the forward portion 102 of the surround 30. The flexible projecting tab 112 or catch 122 may be disposed proximate to and displaced forward of the other of the flexible projecting tab 112 or catch 122 when the movable bin 22 is in the normally closed position. A predetermined force applied against the outer door panel 24 of the movable bin 22 may displace the open receptacle 26 and the flexible projecting tab 112 or catch 122 forward and into engagement with the other of the flexible projecting tab 112 or catch 122, whereby the flexible projecting tab 112 or catch 122 is juxtaposed against and displaced forward of the other of the flexible projecting tab 112 or catch 122 to retain the glove box 20 in the closed position during and after the frontal impact event.

Preferably, the first interlocker 110 may be disposed on an outboard corner 126 or inboard corner 128 of the open receptacle 26 of the movable bin 22, and the second interlocker 120 may be disposed on an edge 64 of the cutout 62 of the corresponding outboard corner 58 or inboard corner 60 of the forward portion 102 of the surround 30. Even more preferably, a first interlocker 110 is disposed on each of the outboard corner 126 and inboard corner 128 of the open receptacle 26 of the movable bin 22, and a complimentary second interlocker 120 is disposed on each of the corresponding cutouts 62 in the outboard corner 58 and inboard corner 60 of the forward portion 102 of the surround 30. In this embodiment, the inboard side glove box retainer 100 may not be the same as the outboard glove box retainer 100, due to packaging constrains, but may employ the same operating principle to retain the glove box 20 closed during a frontal impact event. For example, as shown in FIG. 8A-10B, the outboard glove box retainer 100 may comprise a flexible projecting tab 112 oriented along a substantially vertical plane and the corresponding catch 122 disposed on a portion of an edge the four of the cutout 62 on the forward wall 52 of the surround 30 that is oriented along a substantially vertical edge 64 of the cutout 62 on the forward wall 52 of the surround 30. Conversely, as shown in FIGS. 11A-12C, the inboard flexible projecting tab 112 is oriented along a substantially horizontal plane and the corresponding catch 122 may be disposed on a portion of the edge 64 of the cutout 62 of the forward wall 52 of the surround 30 that is oriented along a substantially horizontal edge 64 of the cutout 62 of the forward wall 52 of the surround 30.

A particularly advantageous feature of the present disclosure is that each of the movable bin 22 and the surround 30 is preferably comprised of an integrated injection molded polymeric material within which each of the flexible projecting tab 112 and catch 122 may be readily integrally molded, respectively. Preferably, each is fabricated from a blend of polypropylene (PP) and thermoplastic polyolefin (TPO) (10%), a blend of TPO, PP, ethylene propylene rubber (EPM), and PP TD20 (20% talc filled), or a composition of PP with 20% carbon fill.

As a feature of the construction herein described, first interlocker 110 and the second interlocker 120 may be simply incorporated in the molds for these components and molded-in during the injection molding process. These molded-in features may be designed with existing die draft orientations. Thus, there are no incremental tooling costs or additional component complexities required to implement the improvement in the disclosed glove box retainers 100.

As an additional feature of the construction herein described, preferably the first interlocker 110 may be manually disengaged from the second interlocker 120 after the frontal impact event via the access provided by the corner cutouts 62 by displacing the first interlocker 110 rearward relative to the second interlocker 120 to withdraw the movable bin 22 from the cavity 28 of the surround 30 and to expose the open receptacle 26. The glove box retainer 100 disclosed herein thus does not permanently interfere with serviceability of the motor vehicle instrument panel 10 after the frontal impact event, yet still provides reliable glove box 20 retention in the normally closed position subsequent a frontal impact event.

The foregoing disclosure provides a glove box retainer 100 that effectively minimizes the probability of the glove box 20 opening during and after a frontal impact event by providing positive mechanical retention of the movable bin 22 relative the surround 30, even in the event that the primary latch assembly 66 for the glove box 20 is rendered inoperative by the frontal impact event. The disclosed glove box retainer 100 further provides these benefits at minimal cost and complexity.

Modifications of the disclosure will occur to those skilled in the art and to those who make or use the concepts disclosed herein. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the present disclosure and other components is not limited to any specific material. Other exemplary embodiments of the disclosure disclosed herein may be formed from a wide variety of materials, unless described otherwise herein.

For purposes of this disclosure, the term "coupled" or "operably coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

For purposes of this disclosure, the term "connected" or "operably connected" (in all of its forms, connect, connecting, connected, etc.) generally means that one component functions with respect to another component, even if there are other components located between the first and second component, and the term "operable" defines a functional relationship between components.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that, unless otherwise described, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating positions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A glove box retainer for retaining a glove box mounted in a motor vehicle instrument panel in a closed position during and after a frontal impact event, the glove box comprising a movable bin having an outer door panel and an open receptacle received within a cavity of a surround fixedly mounted in the motor vehicle instrument panel, the movable bin having a normally closed position, wherein the movable bin is disposed within the cavity of the surround and the open receptacle is not exposed, and an open position, wherein the movable bin is withdrawn from and proximate the cavity of the surround and the open receptacle is exposed, wherein the glove box retainer comprises:

a first interlocker disposed proximate a forward edge of the open receptacle of the movable bin; and a second interlocker disposed proximate a forward portion of the surround, the second interlocker being disposed proximate to and displaced forward of the first interlocker when the movable bin is in the normally closed position;

wherein a predetermined force against the outer door panel of the movable bin displaces the open receptacle and the first interlocker forward and into engagement with the second interlocker, whereby the first interlocker is juxtaposed against and displaced forward of the second interlocker to retain the glove box in the closed position during and after the frontal impact event.

2. The glove box retainer of claim 1, wherein the first interlocker comprises a tab disposed proximate a forward edge of the open receptacle of the movable bin and the second interlocker comprises a catch disposed on an edge of the surround.

3. The glove box retainer of claim 1, wherein one of the first interlocker and the second interlocker further comprises a cam surface facing the other of the first interlocker and the second interlocker, whereby one of the first interlocker or second interlocker is displaced against the cam surface to allow the first interlocker to be displaced forward of the second interlocker during and after a frontal impact event.

4. The glove box retainer of claim 3, wherein the first interlocker and the second interlocker further each comprises a facing and interacting cam surface, whereby one of the first interlocker or second interlocker is displaced to allow the first interlocker to be displaced forward of the second interlocker during and after a frontal impact event.

5. The glove box retainer of claim 3, wherein the first interlocker comprises a flexible projecting tab relative the second interlocker and the second interlocker comprises a catch disposed on a portion of an edge of the surround.

6. The glove box retainer of claim 5, wherein the second interlocker further comprises a notch formed in the edge of the surround within which the flexible projecting tab is received during and after a frontal impact event.

7. The glove box retainer of claim 5, wherein the flexible projecting tab is oriented along a substantially vertical plane and the catch disposed on a portion of an edge of the surround is oriented along a substantially vertical edge of the surround.

8. The glove box retainer of claim 5, wherein the flexible projecting tab is oriented along a substantially horizontal plane and the catch disposed on a portion of an edge of the surround is oriented along a substantially horizontal edge of the surround.

9. The glove box retainer of claim 3, wherein the first interlocker comprises a catch disposed on a forward edge of the open receptacle of the movable bin and the second interlocker comprises a flexible projecting tab disposed on a portion of an edge of the surround.

10. The glove box retainer of claim 1, wherein the first interlocker is disposed on an outboard or inboard corner of the open receptacle of the movable bin and the second interlocker is disposed on a corresponding outboard or inboard corner of the forward portion of the surround.

11. The glove box retainer of claim 10, wherein the first interlocker is disposed on each of the outboard and inboard corners of the open receptacle of the movable bin and the second interlocker is disposed on each of the corresponding outboard and inboard corners of the forward portion of the surround.

12. The glove box retainer of claim 1, wherein the first interlocker may be manually disengaged from the second interlocker after the frontal impact event by displacing the first interlocker rearward relative to the second interlocker to withdraw the movable bin from the cavity of the surround and to expose the open receptacle.

* * * * *